United States Patent
Pratt et al.

(10) Patent No.: US 6,423,434 B1
(45) Date of Patent: Jul. 23, 2002

(54) METHOD AND APPARATUS FOR MANAGING FUEL CELL PERFORMANCE

(75) Inventors: Steven D. Pratt, Plantation; Ronald J. Kelley, Coral Springs; Sivakumar Muthuswamy, Plantation; Robert W. Pennisi, Boca Raton, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/370,157

(22) Filed: Aug. 9, 1999

(51) Int. Cl.⁷ .............................................. H01M 8/04
(52) U.S. Cl. ........................................... 429/13; 429/22
(58) Field of Search ............................ 429/12, 13, 22, 429/14, 15, 16, 17, 23, 24, 28

(56) References Cited

U.S. PATENT DOCUMENTS

| | | | |
|---|---|---|---|
| 4,537,839 A | | 8/1985 | Cameron .................... 429/20 |
| 4,904,548 A | * | 2/1990 | Tajima ....................... 429/22 |
| 5,366,818 A | | 11/1994 | Wilkinson et al. ............. 429/13 |
| 5,624,768 A | * | 4/1997 | Tanokura ..................... 429/23 |
| 5,637,414 A | * | 6/1997 | Inone et al. .................. 429/13 |
| 5,677,073 A | * | 10/1997 | Kawatsu ...................... 429/22 |
| 5,763,113 A | * | 6/1998 | Meltser et al. ................ 429/13 |
| 5,783,324 A | | 7/1998 | Binder et al. ................. 429/31 |
| 6,103,409 A | * | 8/2000 | Di Pierno Bosco et al. .. 429/13 |
| 6,242,119 B1 | * | 6/2001 | Komura et al. ............... 429/17 |

* cited by examiner

*Primary Examiner*—Stephen Kalafut
*Assistant Examiner*—M. Wills
(74) *Attorney, Agent, or Firm*—Dale W. Dorinski; Randi L. Dulaney

(57) ABSTRACT

A method and apparatus for managing the performance of a fuel cell system (100) using an agitation means (150). The method of managing the performance involves, monitoring operational parameters (110) of individual fuel cells and the overall fuel cell system, comparing performance parameters (120) of the system against target values, selecting a control method (130) from a set of available control methods based on the result of comparison of the performance parameters against the target values and using that control method to initiate and control an agitation process, and actuating (140) an agitation means using the selected control method so as alter the monitored operational parameters (160).

28 Claims, 5 Drawing Sheets

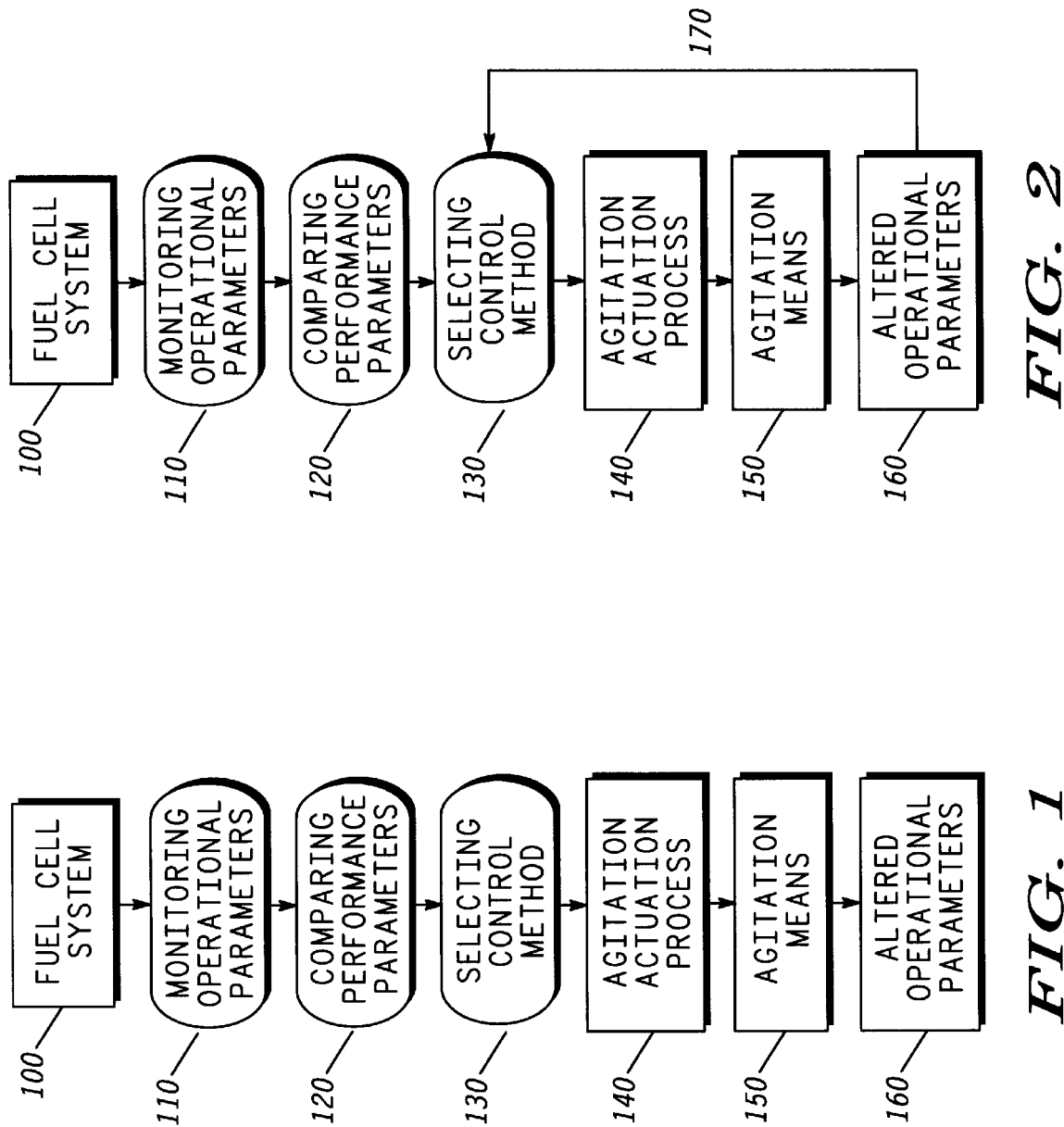

METHOD AND APPARATUS FOR MANAGING FUEL CELL PERFORMANCE

TECHNICAL FIELD

This invention relates to fuel cells in general and a method of managing the performance a fuel cell in particular.

BACKGROUND

Fuel cells are electrochemical cells in which a free energy change resulting from a fuel oxidation reaction is converted into electrical energy. A typical fuel cell consists of a fuel electrode (anode) and an oxidant electrode (cathode), separated by an ion-conducting electrolyte. The electrodes are connected electrically to a load (such as an electronic circuit) by an external circuit conductor. In the circuit conductor, electric current is transported by the flow of electrons, whereas in the electrolyte it is transported by the flow of ions, such as the hydrogen ion (H+) in acid electrolytes, or the hydroxyl ion (OH–) in alkaline electrolytes. In theory, any substance capable of chemical oxidation that can be supplied continuously (as a gas or fluid) can be oxidized galvanically as the fuel at the anode of a fuel cell. Similarly, the oxidant can be any material that can be reduced at a sufficient rate. Gaseous hydrogen has become the fuel of choice for most applications, because of its high reactivity in the presence of suitable catalysts and because of its high energy density. Similarly, at the fuel cell cathode the most common oxidant is gaseous oxygen, which is readily and economically available from the air for fuel cells used in terrestrial applications. When gaseous hydrogen and oxygen are used as fuel and oxidant, the electrodes are porous to permit the gas-electrolyte junction to be as great as possible. The electrodes must be electronic conductors, and possess the appropriate reactivity to give significant reaction rates. At the anode, incoming hydrogen gas ionizes to produce hydrogen ions and electrons. Since the electrolyte is a non-electronic conductor, the electrons flow away from the anode via the metallic external circuit. At the cathode, oxygen gas reacts with the hydrogen ions migrating through the electrolyte and the incoming electrons from the external circuit to produce water as a byproduct. The byproduct water is typically extracted as vapor. The overall reaction that takes place in the fuel cell is the sum of the anode and cathode reactions, with part of the free energy of reaction released directly as electrical energy. The difference between this available free energy and the heat of reaction is produced as heat at the temperature of the fuel cell. It can be seen that as long as hydrogen and oxygen are fed to the fuel cell, the flow of electric current will be sustained by electronic flow in the external circuit and ionic flow in the electrolyte.

In practice, a number of these unit fuel cells are normally stacked or 'ganged' together to form a fuel cell assembly. A number of individual cells are electrically connected in series by abutting the anode current collector of one cell with the cathode current collector of its nearest neighbor in the stack. Fuel and oxidant are introduced through manifolds into respective chambers. An alternate style of fuel cell has been recently proposed (U.S. Pat. No. 5,783,324) which is a side-by-side configuration in which a number of individual cells are placed next to each other in a planar arrangement. This is an elegant solution to the problem of gas transport and mechanical hardware.

In most traditional fuel cell applications the fuel and oxidant supply streams are designed as flow-through systems. Flow-through systems add a parasitic load to the fuel cell output and thus reduces the net power that can be extracted from the fuel cell power source. In order to reduce the parasitic load, alternate configurations have been proposed in the prior art where the fuel stream or the oxidant stream or both are "dead-ended". This dead-ended operation creates special problems. Two major problems with dead-ended fuel flow stream fuel cells are water removal and accumulation of impurities. These two problems lead to degradation of performance of fuel cells.

Design of fuel cells for portable applications need to be small and with air serving as the oxidant. Fuel cells for these applications are typically operated in a "dead-ended" fuel delivery system configuration with the cathode side open to air. A classical problem with these air breathing planar fuel cells is water management. Since the byproduct water is produced at the cathode, it evaporates away during normal operation. However, under heavy load, the evaporation rate lags the rate of formation and water tends to migrate back through the polymer electrolyte to the anode side. Some spots on a fuel cell are cooler than others, and the moisture condenses at these locations into liquid water, flooding the anode and impeding the flow of fuel to the anode.

Prior art recognizes problems with dead-ended operation such as impurity build-up and water accumulation at the anode. The accumulated impurities may poison the anode reaction sites. Inert contaminants would also result in loss of performance by lowering the fuel partial pressure. In the prior art (see, for example, U.S. Pat. Nos. 5,366,818 and 4,537,839), these issues are addressed by a brief controlled release of the fuel gas conducted at regular intervals. The purging operation involves controlled venting of a proportion (perhaps from 0.1 to 10%) of gaseous fuel or oxidant through a throttled opening. This purging action removes any accumulated impurities, water and fine particulates from the fuel cell and restores fuel cell performance. Many schemes have also been taught in the prior-art to control the length of, and intervals between, successive purges. One such scheme is to monitor data from the fuel cell power output to provide for the exhaust to be approximately proportional to the amount of hydrogen consumed by the cell.

Although purging can improve performance of dead-ended fuel cell systems by removing water and impurities, it wastes valuable fuel or oxidant and increases the parasitic loading on the system. It would, therefore, be an advancement in the art of fuel cell systems to have a dead-ended system that reduces or completely eliminates the need for purging.

BRIEF DESCRIPTION OF THE DRAWINGS

FIG. 1 is a process flow diagram in accordance with the first embodiment of the present invention.

FIG. 2 is a process flow diagram in accordance with the second embodiment of the invention.

DETAILED DESCRIPTION OF THE PREFERRED EMBODIMENT

Figure 3:
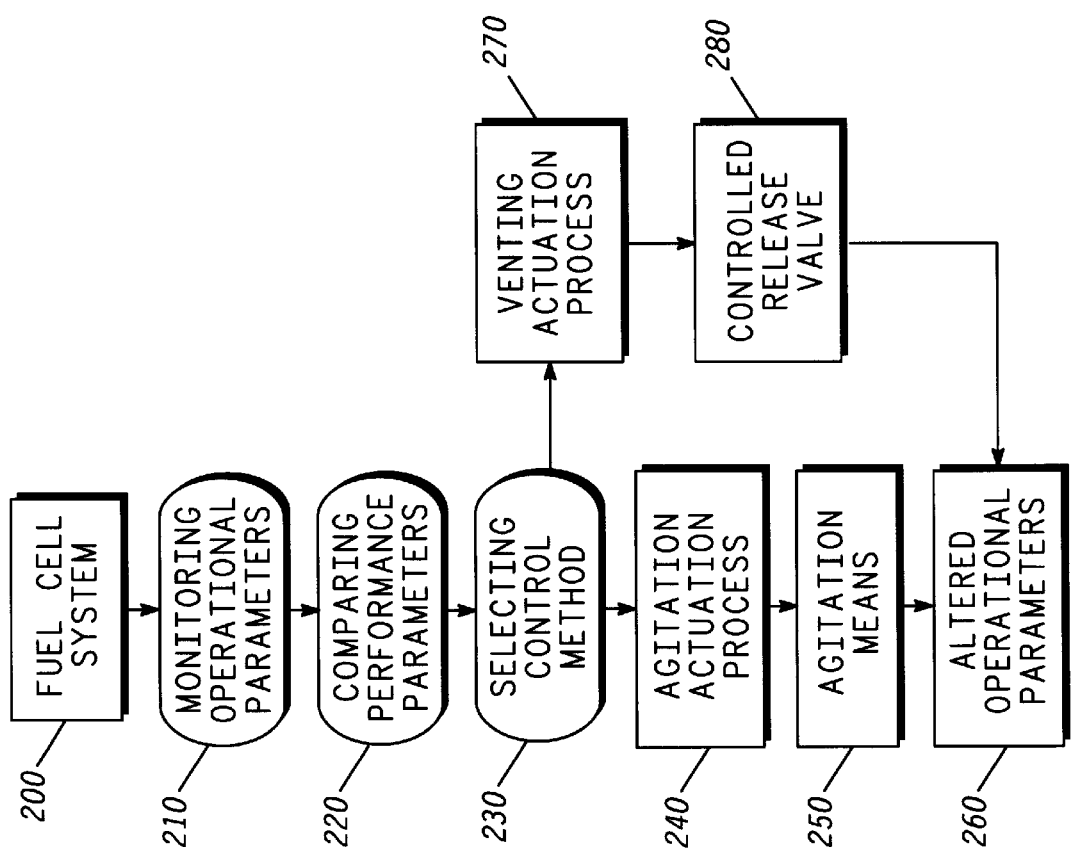
FIG. 3 is a process flow diagram in accordance with the third embodiment of the present invention.

A method and apparatus for managing the performance of a fuel cell using an agitation and/or venting means is disclosed. The method of managing the performance involves: monitoring operational parameters of individual fuel cells and the overall fuel cell system, comparing performance parameters of the system against target values, selecting a control method from a plurality of available control methods based on the result of comparison of the performance parameters against the target values, using that control method to initiate and control an agitation process, and actuating an agitation means using the selected control method so as alter the monitored operational parameters.

FIG. 1 shows a typical flow chart of the process used to manage the performance of the fuel cell according to a first embodiment of the present invention where the rectangular boxes represent structural entities in the process, and boxes with rounded corners represent process steps to achieve the various structural entities. Referring now to FIG. 1, the performance management process starts with monitoring operational parameters 110 of the individual fuel cells in the fuel cell system 100. Typical operational parameters monitored are current output, voltage output and internal resistance of the fuel cells in the system. In addition, temperature and humidity at different locations of the fuel cells may also be monitored. The system performance parameters are then compared 120 to a predetermined set of ideal target values to assess the performance of the fuel cell system. The system performance parameters can either be computed from the operational parameters or can be directly measured. The reader should understand that the performance parameters are not the same as operational parameters. The operational parameters are associated with the individual fuel cells while the performance parameters are associated with the fuel cell system. The performance parameters are a function of the operational parameters. Typical performance parameters of a fuel cell system that are compared are fuel cell system power output, fuel cell system current-voltage (IV curve) characteristics, fuel cell system load factor, fuel cell system electrical efficiency, and fuel and oxidant utilization efficiency. The goal of this comparison is to assess how close the performance of the fuel cell system under observation is to an ideal or "optimized" fuel cell system.

Although the preferred embodiment has listed some of the more commonly used operational and performance parameters of a fuel cell system, the present invention is not necessarily limited by the use of these parameters. Any set of measurable or computable operating and performance parameters can be used within the structure described in the preferred embodiment. Following the comparison step 120, a control method is selected 130 from a list of available control methods. The control method has the necessary parameters and logic to define an agitation initiation process 140 which in turn actuates an agitation means 150. Some of the key parameters defined in the control method include amplitude, frequency and length of each agitation cycle, sequence of agitation cycles, and selection of fuel cells and the fuel cell sides on which to initiate the agitation. The agitation can be imparted either to one or more components of the fuel cell or to the fuel or oxidant used in the fuel cell.

The agitation causes mixing of vapor, liquid, particulate and gaseous components in the fuel cell system. In addition, the agitation also causes contaminants to be dislodged from anode, cathode and other active surfaces of the fuel cell. When the fuel cell is sufficiently agitated, the equilibrium of the fuel cell is perturbed such that the operational parameters 160 of the fuel cell system are altered. The preferred actuation means is one or more ultrasonic wave generators strategically positioned in the fuel cell system. Some alternate agitation means are acoustic excitation, mechanical vibration, thermal excitation, electromechanical excitation, pulsation of fuel cell fuel and pulsation of fuel cell oxidant. The various agitation means referred to above are described and known in the literature, and since one of ordinary skill in the art is assumed to be familiar with these, they will not be further elaborated upon here. In addition to the agitation means described above, many other agitation means can be used to implement this fuel cell performance management method.

The second embodiment of the performance management method shown in FIG. 2, uses a closed-loop configuration with a feedback loop 170, wherein the change in operational parameters as a result of actuation of agitation means is fed back to the step of selecting the control method. The parameters and logic of the selected control method are fine-tuned based on the feedback information. This updated control method is used to update the actuation process which in turn actuates the agitation means for a second time. This feedback and update process is repeated as necessary.

The third embodiment of the performance management method shown in FIG. 3, comprises the additional steps of defining the venting actuation process 270, which operates a controlled release valve 280 to a purge desired quantity of vapor, liquid, particulate and gaseous components from the fuel cell system. The operation of the controlled release valve is coordinated with the agitation actuation sequence. For example, the release valve may be opened at a defined period of time after the agitation process is completed.

Figure 4:
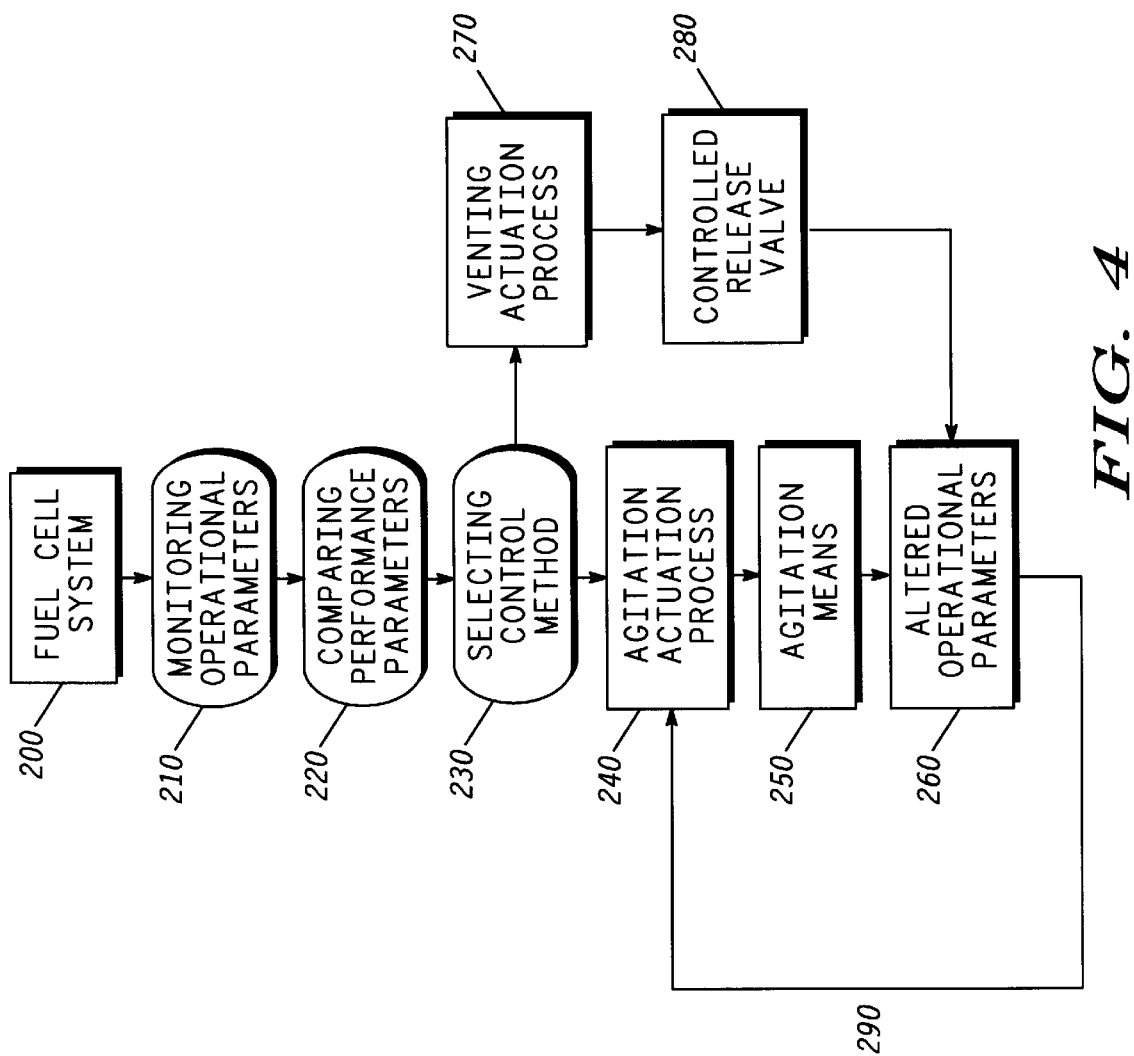
FIG. 4 is a process flow diagram in accordance with the fourth embodiment of the present invention.

A fourth embodiment of the performance management method using a closed-loop configuration is depicted in FIG. 4. This embodiment comprises the additional steps of defining the venting actuation process 270, which operates a controlled release valve 280 to purge desired quantity of vapor, liquid, particulate and gaseous components from the fuel cell system. It also incorporates a feedback loop 290, wherein the change in operational parameters as a result of actuation of agitation means and controlled release valve is fed back to the step of selecting the control method. The parameters and logic of the selected control method are fine-tuned based on the feedback information. This updated control method is used to update the actuation and the venting process. This feedback and update process is repeated as necessary.

Figure 5:
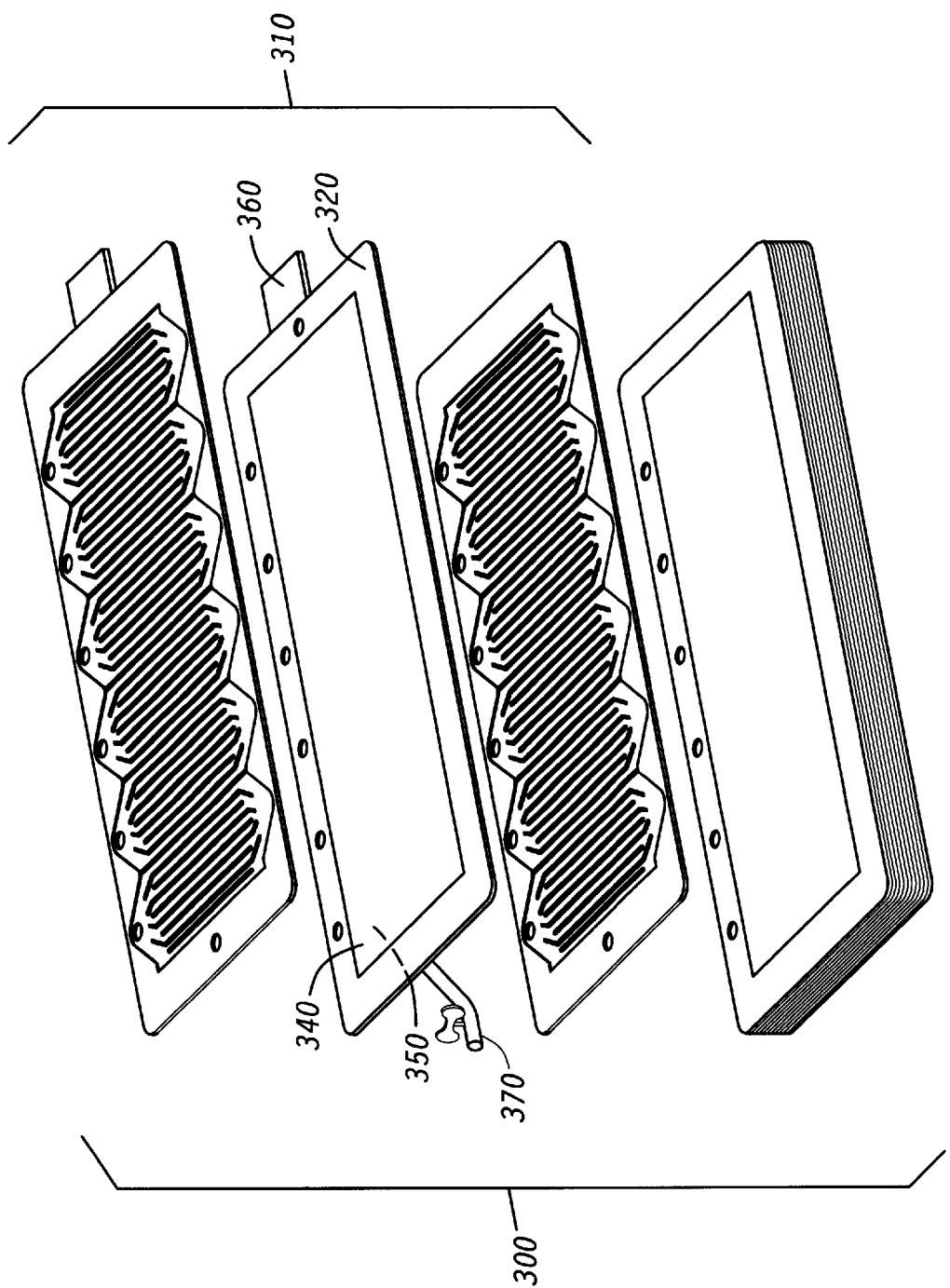
FIG. 5 is a schematic representation of an apparatus to implement the performance management method in accordance with the present invention.

FIG. 5 shows a schematic view of an apparatus for implementing the fuel cell performance management method. The apparatus 300 consists of a plurality of fuel cells, each fuel cell 310 having a membrane electrode assembly 320 having two opposing major sides. Each of the membrane electrode assemblies comprises a solid electrolyte disposed between and in intimate contact with an anode 340 and a cathode 350. The fuel cell also has an agitation means 360 which provides agitation to at least one portion of the fuel cell. The agitation causes mixing of vapor, liquid, particulates and gaseous components in the fuel cell. In addition, the agitation also causes contaminants to be dislodged from anode, cathode and other active surfaces of the fuel cell. Optionally, the fuel cell also incorporates a release valve 370 for selective, controlled release of agitated components from the fuel cell. The dislodging action, mixing action and the optional release action effectively manage the performance of the fuel cell by removing the contaminants and water particles away from the membrane electrode assembly interfaces.

Figure 6:
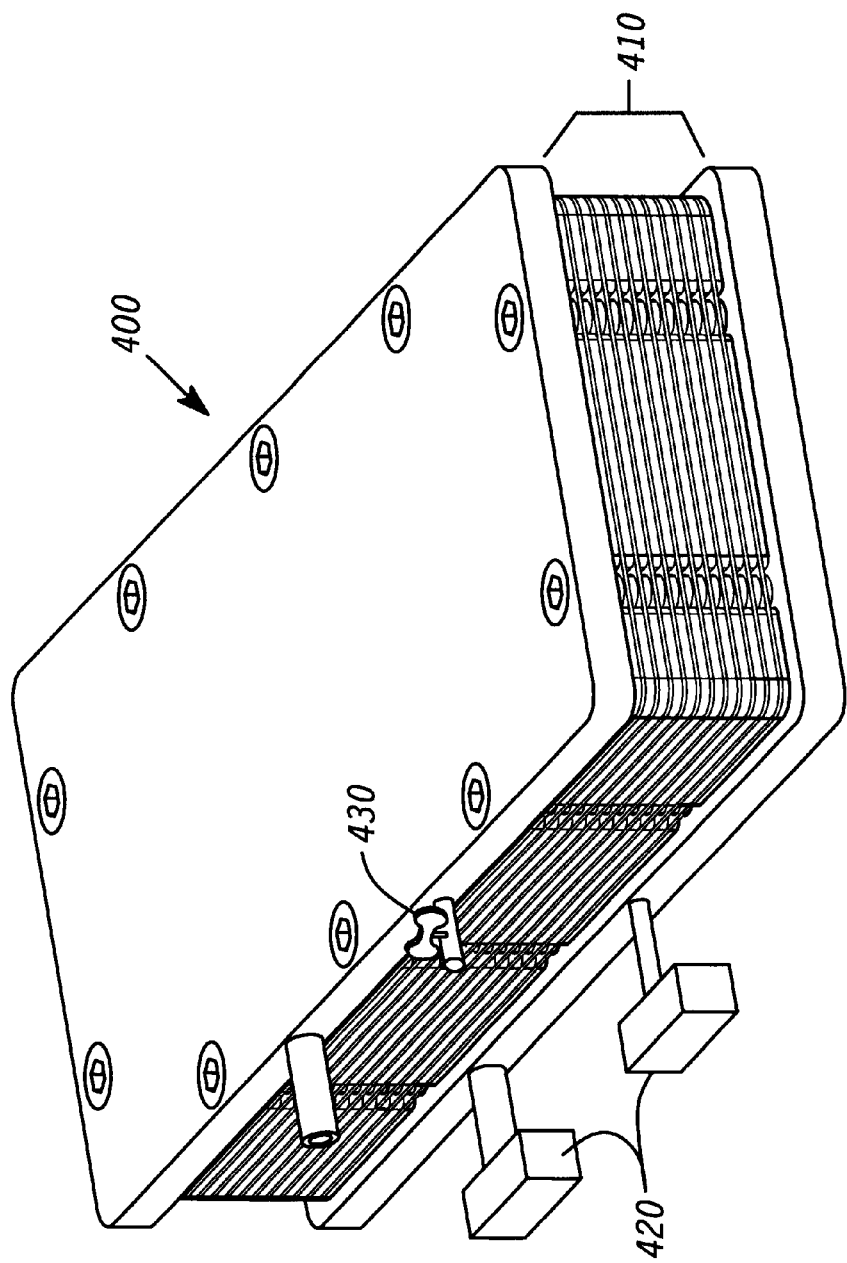
FIG. 6 is a schematic representation of an alternate embodiment of the apparatus to implement the performance management method in accordance with the present invention.

FIG. 6 shows a schematic view of an alternate embodiment of an apparatus for implementing the fuel cell performance management method. The apparatus 400 consists of a plurality of fuel cells 410 with one or more agitation means 420 disposed on the fuel or oxidant entry point. The agitation means 420 imparts vibration energy to fuel and/or oxidant streams. Optionally, the fuel cell system also incorporates a release valve 430 for selective, controlled release of agitated components from the fuel cell. The dislodging action, mixing action and the optional release action effectively manage the performance of the fuel cell by removing the contaminants and water particles away from the membrane electrode assembly interfaces.

The present invention enhances the performance of a fuel cell system by moving contaminants and water away from the electrode interface. The agitation also facilitates the removal of fine water particles from the electrolyte surface thus mitigating the flooding problem encountered in fuel cells without special water management means. The parasitic loading due to the agitation and venting on a fuel cell is quite minimal. The present invention provides a method and an apparatus for managing the performance of a fuel which overcomes the disadvantages of the prior-art methods and devices of this general type and which make it possible for a fuel cell system, particularly a system including solid electrolyte fuel cells, to be operated with virtually 100% fuel/oxidant utilization at an efficiency that is constant over time, by suitable agitation and/or removal of the contaminants and/or product water. This unique agitation method is simple to implement and control.

While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A method for managing performance of a fuel cell system having a plurality of fuel cells, each fuel cell having an anode side, a cathode side, and a plurality of operational parameters characterizing its operational state, the method comprising:

comparing performance parameters of the system against target values to produce a result, said performance parameters being a function of at least one of the plurality of operational parameters of at least one of the plurality of fuel cells in the system, wherein one or more of the operational parameters degrade in response to the settling of a plurality of contaminants on at least one portion of the at least one of the plurality of fuel cells;

selecting at least one control method from a plurality of control methods based on the value of said result;

initiating an actuation cycle to actuate an agitation means using the selected control method; and agitating the at least one of the plurality of fuel cells using the agitation means, wherein the agitation causes mixing of vapor, liquid, particulates and gaseous components on at least one portion of the fuel cell, and further wherein the agitation causes the plurality of contaminants to be dislodged from the at least one portion of the at least one of the plurality of fuel cells thereby reducing the degradation of the one or more operational parameters.

2. The method of claim 1, wherein the control method comprises amplitude, frequency and length of the agitation cycle, sequence of agitation cycles, target fuel cells and target fuel cell sides on which to initiate the agitation.

3. The method of claim 1, wherein the step of initiating further comprises controlled discharge of fuel, water, particulates or contaminant gas components from the fuel cell system.

4. The method of claim 1, wherein the step of initiating further comprises controlled discharge of oxidant, water, particulates or contaminant gas components from the fuel cell system.

5. The method of claim 1, wherein the agitation means is selected from the group consisting of ultrasonic waves, acoustic excitation, mechanical vibration, thermal excitation, electromechanical excitation, pulsation of fuel cell fuel and pulsation of fuel cell oxidant.

6. The method of claim 1, wherein the monitored operating parameters are selected from the group consisting of fuel cell current output, fuel cell voltage output, fuel cell internal resistance, and temperature and humidity of the fuel cells.

7. The method of claim 1, wherein the compared performance parameters are selected from the group consisting of fuel cell system power output, fuel cell system current-voltage (IV curve) characteristics, fuel cell system load factor, fuel cell system electrical efficiency, and fuel and oxidant utilization efficiency.

8. A method for managing performance of a fuel cell system having a plurality of fuel cells, each fuel cell having an anode side, a cathode side, and a plurality of operational parameters characterizing its operational state, the method comprising:

comparing performance parameters of the system, selected from the group consisting of fuel cell system power output, fuel cell system current-voltage (IV curve) characteristics, fuel cell system load factor, fuel cell system electrical efficiency, and fuel and oxidant utilization efficiency of the system against target values to produce a result, said performance parameters being a function of at least one of a plurality of operational parameters selected from the group consisting of fuel cell current output, fuel cell voltage output, fuel cell internal resistance, and temperature and humidity at different locations in the fuel cell, of at least one of the plurality of fuel cells in the system, wherein one or more of the operational parameters degrade in response to the settling of a plurality of contaminants on at least one portion of the at least one of the plurality of fuel cells;

selecting at least one control method from a plurality of control methods based on the value of said result;

initiating an actuation cycle to actuate an agitation means selected from the group consisting of ultrasonic waves, acoustic excitation, mechanical vibration, thermal excitation, electromechanical excitation, pulsation of fuel cell fuel and pulsation of fuel cell oxidant using the selected control method; and agitating the at least one of the plurality of fuel cells using the agitation means, wherein the agitation causes mixing of vapor, liquid; particulates and gaseous components on at least one portion of the fuel cell, and further wherein the agitation causes the plurality of contaminants to be dislodged from the at least one portion of the at least one of the plurality of fuel cells thereby reducing the degradation of the one or more operational parameters.

9. The method of claim 8, wherein the control method comprises amplitude, frequency and length of the agitation cycle, sequence of agitation cycles, target fuel cells and target fuel cell sides on which to initiate the agitation.

10. The method of claim 8, wherein the step of initiating further comprises controlled discharge of fuel, water, particulates or contaminant gas components from the fuel cell system.

11. The method of claim 8, wherein the step of initiating further comprises controlled discharge of oxidant, water, particulates or contaminant gas components from the fuel cell system.

12. A method for controlling performance of a fuel cell system, having a plurality of fuel cells, each fuel cell having a plurality of operational parameters characterizing its operational state, wherein one or more of the operational parameters degrade in response to the settling of a plurality of contaminants on at least one portion of the fuel cell, the method comprising selecting and using a control method, initiating an agitation cycle to actuate an agitation means using the selected control method, and agitating at least one of the plurality of fuel cells sufficient to cause mixing of vapor, liquid, particulates and gaseous components and further to cause the plurality of contaminants to be dislodged from the at least one portion of the at least one of the plurality of fuel cells thereby reducing the degradation of the one or more operational parameters in the fuel cell system.

13. The method of claim 12, wherein the control method comprises amplitude, frequency and length of the agitation cycle, sequence of agitation cycles, target fuel cells and target fuel cell sides on which to initiate the agitation.

14. The method of claim 12 further comprising controlled discharge of fuel, water, particulates or contaminant gas components from the fuel cell system.

15. The method of claim 12 further comprising controlled discharge of oxidant, water, particulates and contaminant gas components from the fuel cell system.

16. A method for managing performance of a fuel cell system having a plurality of fuel cells, each fuel cell having an anode side, a cathode side, and a plurality of operational parameters characterizing its operational state, the method comprising the following steps in the order named:
   a) monitoring operational parameters of at least one of the plurality of fuel cells in the system, wherein one or more of the operational parameters degrade in response to the settling of a plurality of contaminants on at least one portion of the at least one of the plurality of fuel cells;
   b) comparing performance parameters of the system against target values to produce a result;
   c) selecting at least one control method from a plurality of control methods based on the value of said result; and
   d) initiating an actuation cycle to actuate an agitation means using the selected control method so as alter the operational parameters; and
   e) agitating the at least one of the plurality of fuel cells using the agitation means, wherein the agitation causes mixing of vapor, liquid, particulates and gaseous components on at least one portion of the fuel cell, and further wherein the agitation causes the plurality of contaminants to be dislodged from the at least one portion of the at least one of the plurality of fuel cells thereby reducing the degradation of the one or more operational parameters.

17. The method of claim 16, wherein the control method comprises amplitude, frequency and length of the agitation cycle, sequence of agitation cycles, target fuel cells and target fuel cell sides on which to initiate the agitation.

18. The method of claim 16, wherein the step of initiating further comprises controlled discharge of fuel, water, particulates or contaminant gas components from the fuel cell system.

19. The method of claim 16, wherein the step of initiating further comprises controlled discharge of oxidant, water, particulates or contaminant gas components from the fuel cell system.

20. The method of claim 16, wherein the agitation means is selected from the group consisting of ultrasonic waves, acoustic excitation, mechanical vibration, thermal excitation, electromechanical excitation, pulsation of fuel cell fuel and pulsation of fuel cell oxidant.

21. The method of claim 16, wherein the monitored operating parameters are selected from the group consisting of fuel cell current output, fuel cell voltage output, fuel cell internal resistance, and temperature and humidity of the fuel cells.

22. The method of claim 16, wherein the compared performance parameters are selected from the group consisting of fuel cell system power output, fuel cell system current-voltage (IV curve) characteristics, fuel cell system load factor, fuel cell system electrical efficiency, and fuel and oxidant utilization efficiency.

23. A fuel cell having a plurality of operational parameters characterizing the operational state of the fuel cell, comprising:
   at least one membrane electrode assembly, having two major sides, comprising a solid electrolyte disposed between and in intimate contact with an anode forming first major side of the membrane electrode assembly and a cathode forming second major side of the membrane electrode assembly, wherein a plurality of contaminants settle on at least one side of the membrane electrode assembly during operation of the fuel cell, and further wherein the contaminants cause a degradation in one or more of the operational parameters; and
   an agitation means to provide agitation to at least one portion of the fuel cell, wherein the agitation means operates in response to the degradation in the one or more operational parameters;
   wherein the agitation produces mixing of vapor, liquid, particulates and gaseous components at least on one major side of the membrane electrode assembly, and further wherein the agitation causes the plurality of contaminants to be dislodged from at least one portion of the fuel cell thereby reducing the degradation of the one or more operational parameters.

24. The fuel cell as described in claim 23, wherein the agitation means is disposed on the first major side, the second major side or both sides of the membrane electrode assembly.

25. The fuel cell as described in claim 23, wherein the agitation means is selected from the group consisting of ultrasonic waves, acoustic excitation, mechanical vibration, thermal excitation, electromechanical excitation, pulsation of fuel cell fuel and pulsation of fuel cell oxidant.

26. The fuel cell as described in claim 23, wherein the membrane electrode assemblies are disposed in a stacked arrangement.

27. The fuel cell as described in claim 23, wherein the membrane electrode assemblies are disposed in a planar arrangement.

28. The fuel cell as described in claim 23, wherein the agitation means further comprises a release valve for selective, controlled release of the agitated components from the fuel cell.

* * * * *